United States Patent
Kuroki et al.

(10) Patent No.: US 7,583,311 B2
(45) Date of Patent: Sep. 1, 2009

(54) AUTOMATIC FOCUSING DEVICE AND FOCUSING METHOD

(75) Inventors: Tsutomu Kuroki, Hachioji (JP); Takeshi Kindaichi, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 498 days.

(21) Appl. No.: 11/397,516

(22) Filed: Apr. 4, 2006

(65) Prior Publication Data

US 2006/0227238 A1    Oct. 12, 2006

(30) Foreign Application Priority Data

Apr. 11, 2005   (JP) ............................... 2005-113409

(51) Int. Cl.
- H04N 5/232 (2006.01)
- H04N 5/225 (2006.01)
- H04N 9/68 (2006.01)
- G03B 13/00 (2006.01)
- G03B 17/00 (2006.01)
- G03B 3/00 (2006.01)

(52) U.S. Cl. ............. 348/353; 348/335; 348/345; 348/349; 348/234; 348/354; 348/355; 396/77; 396/79; 396/124

(58) Field of Classification Search ............... 348/234, 348/235, 663, 357, 345–356; 396/79, 77, 396/78, 80, 124, 125

See application file for complete search history.

(56) References Cited

U.S. PATENT DOCUMENTS

| | | | |
|---|---|---|---|
| 6,075,562 A | * | 6/2000 | Sakaguchi et al. ........ 348/223.1 |
| 2004/0012709 A1 | * | 1/2004 | Hirai .......................... 348/345 |
| 2004/0169767 A1 | * | 9/2004 | Norita et al. ................ 348/350 |
| 2006/0103745 A1 | * | 5/2006 | Nagaishi et al. ............. 348/294 |

FOREIGN PATENT DOCUMENTS

| | | | |
|---|---|---|---|
| JP | 63-215172 | | 9/1988 |
| JP | 06-350902 | | 12/1994 |
| JP | 2001-106243 | * | 4/2001 |
| JP | 2002-303780 | | 10/2002 |

* cited by examiner

*Primary Examiner*—Jason Chan
*Assistant Examiner*—Michael Osinski
(74) *Attorney, Agent, or Firm*—Straub & Pokotylo; John C. Pokotylo

(57) ABSTRACT

In an automatic focusing device generating a luminance signal by scanning a picked-up digital image signal, evaluating the contrast of the luminance signal, and driving its focusing based on the evaluation; the scanning includes at least a part where scan is performed in a zigzag-like manner. With this configuration, focusing is facilitated for an object having no high frequency components in the horizontal direction. This invention can be understood as an invention of a method.

19 Claims, 14 Drawing Sheets

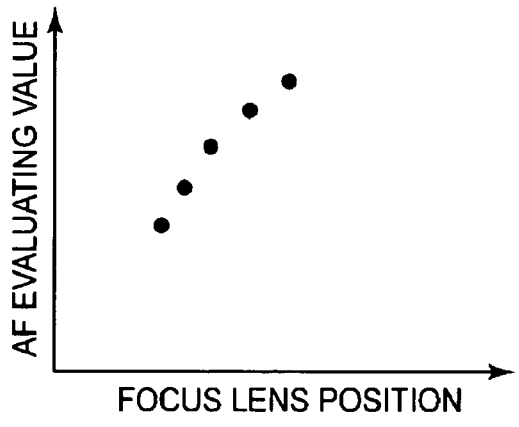 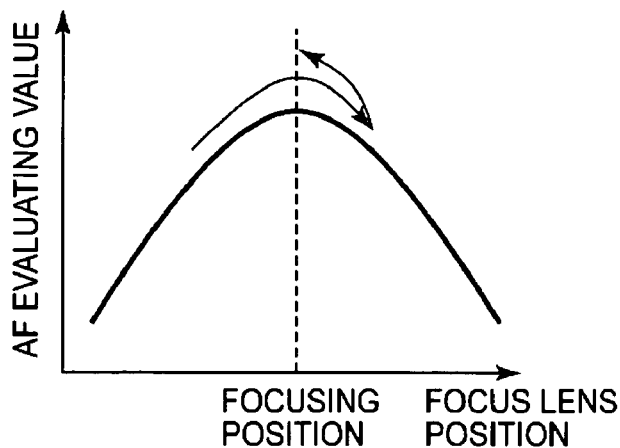
Fig. 3A  Fig. 3B
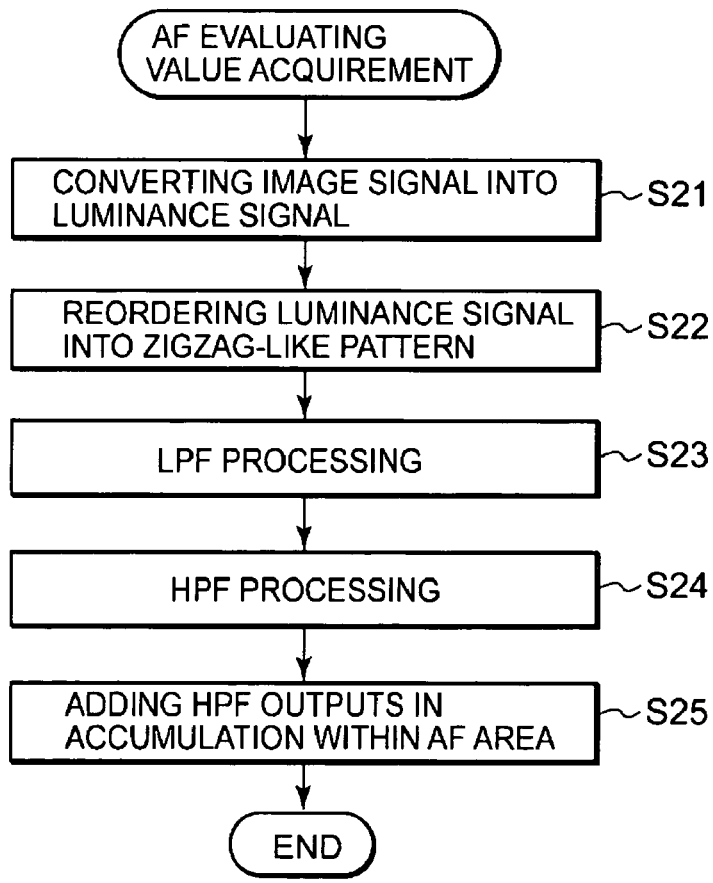
Fig. 4

V-WIDTH=2

V-WIDTH=3

V-WIDTH=4

V/H=1/1

V/H=3/4

V/H=4/3

AUTOMATIC FOCUSING DEVICE AND FOCUSING METHOD

CROSS-REFERENCE TO RELATED APPLICATION

This application is based upon and claims the benefit of priority from prior Japanese Patent Application No. 2005-113409, filed Apr. 11, 2005, the entire content of which is incorporated herein by reference.

BACKGROUND OF THE INVENTION

1. Field of the Invention

The present invention relates to an automatic focusing device and a focusing method, and in particular to an automatic focusing device and a focusing method, using an image pick-up element so as to carry out focusing.

2. Description of the Related Art

A voltage level of a high frequency component (high contrast part) contained in an image signal obtained by an image pick-up element corresponds to a focusing condition. In view of this phenomenon, there has been known an automatic focusing device for driving a focus lens to a position where the voltage level of a high frequency component is maximum so as to carry out focusing. Such an automatic focusing device is the so-called "hill-climbing servo system" or "contrast system".

It is noted that in a conventional hill climbing servo system, an image signal is scanned in a horizontal direction for focusing so as to extract a high frequency component. Accordingly, it is difficult to precisely carry out focusing for an object to be picked up having no high frequency components in a horizontal direction, such as a horizontal stripe, even though the object to be picked up has a high contrast.

Thus, there have been proposed various measures for extracting high frequency components not only in a horizontal direction but also in a vertical direction so as to precisely carry out focusing even for an object to be picked up having no high frequency components in the horizontal direction.

For example, Japanese Patent Laid-Open No. H06-350902 discloses such a configuration that a pixel at a predetermined position is read out per one line in order to read out luminance signals stored in a memory in an obliquely 45 deg. direction.

Further, Japanese Patent Laid-Open No. 2002-303780 discloses such a configuration that an image at one frame is converted into luminance signals which are scanned in a focus detecting zone formed in a circular shape on a screen in a chordwise direction passing through the center of the circle in order to calculate a contrast value.

Further, Japanese Patent No. 2843981 discloses such a configuration that a high range frequency component is extracted from a low range frequency component, in a horizontal direction, of an image signal.

BRIEF SUMMARY OF THE INVENTION

The automatic focusing device of this invention produces a luminance signal through scanning the captured digital image, evaluates the contrast of the luminance signal, and drives the focusing based on the evaluation. In this automatic focusing device, the scanning contains at least a part where scan is performed in a zigzag-like manner.

As for a specific configuration, the automatic focusing device comprising: an image pick-up element for obtaining image signals by picking up an image of an object; an A/D converting circuit for converting the image signals obtained in the image pick-up element into digital image signals; a contrast acquiring portion for producing luminance signals through a scanning which contain at least a part where scan is performed in a zigzag-like manner, from the digital image signals obtained in the A/D converting circuit, and for acquiring contrast values from the produced luminance signals; a cumulative adding portion for adding in accumulation the contrast values obtained in the contrast acquiring portion to compute a contrast evaluating value; and a focus lens drive portion for driving a focus lens to a position where the contrast evaluating value computed in the cumulative adding portion is maximum.

BRIEF DESCRIPTION OF SEVERAL VIEWS OF THE DRAWING

These and other features, aspects and advantages of the apparatus and methods of the present invention will become better understood with regard to the following description, appended claims and accompanying drawings where:

FIGS. 3A to 3B are views for explaining AF in a hill climbing servo system;

FIG. 4 is a flow chart for explaining a process flow of acquirement of AF evaluation value;

DETAILED DESCRIPTION OF THE PREFERRED EMBODIMENTS

Preferred embodiments of the invention will be described below with reference to the accompanying drawings.

First Embodiment

Figure 1:
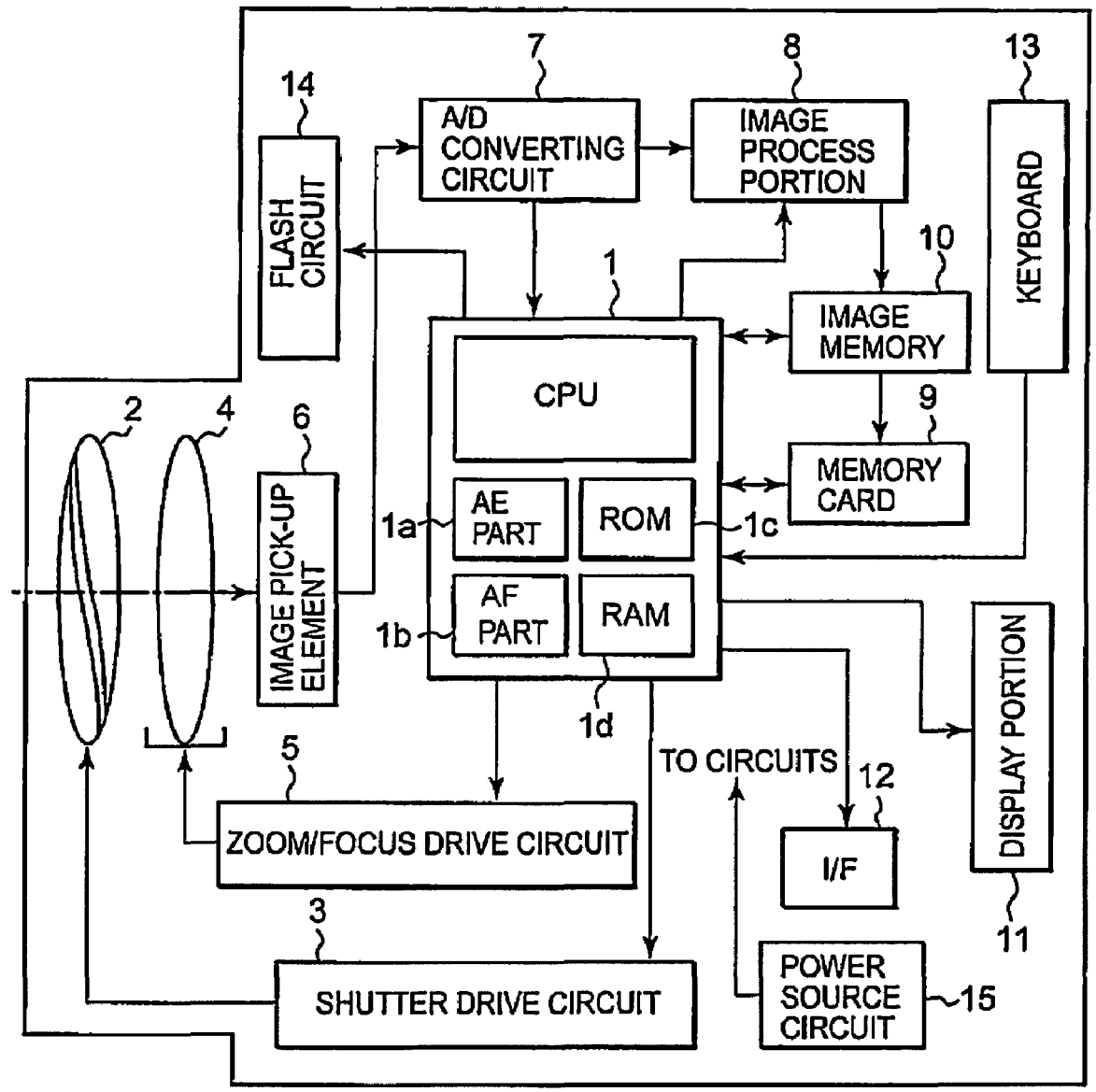
FIG. 1 is a view illustrating a digital camera which incorporates an automatic focusing device in a first embodiment of the present invention.

FIG. 1 is a view which shows a configuration of a digital camera incorporating therein an automatic focusing device in an embodiment of the present invention. It is noted here that the digital camera shown in FIG. 1 is the one which is capable of carrying out automatic focusing of a hill climbing servo type.

Referring to FIG. 1, a CPU 1 controls circuits incorporated in the digital camera. Further, the CPU 1 is provided therein with an automatic exposure (AE) detecting part 1a, an automatic focus (AF) detecting part 1b, a ROM 1c and a RAM 1d. The AE part 1a is adapted to compute an AE evaluating value from which a degree of exposure is computed. The AF part 1b computes an AF evaluating value for carrying out a hill climbing servo AF. Further, the ROM 1c stores therein various programs and various adjusting data for the digital camera which are processed by the CPU 1. The RAM 1d temporarily stores therein various computed results obtained by the AE part 1a and the AF part 1b.

Further, referring to FIG. 1, a shutter 2 which also serves as an aperture, is opened and closed by a shutter drive circuit 3 which is controlled by the CPU 1 so as to adjust a quantity of light from an object to be picked up (which is not shown), and cuts off light to an image pick-up element 6. A lens group 4 is arranged in rear of the shutter 2. The lens group 4 which is composed of a plurality of lenses such as a focus lens or a zoom lens, and is adapted to focus a light beam entering through the shutter 2 onto the image pick-up element 6. Further, the lenses of the lens group are driven in the direction of the optical axis by a zoom/focus drive circuit 5 serving as a zoom/focus lens drive portion. Accordingly, the focusing control and the zooming control are carried out. The zoom/focus drive circuit 5 is controlled by the CPU 1.

The image pick-up element 6 delivers an image signal depending upon a light quantity of an incident light beam, to an A/D converting circuit 7. The A/D converting circuit 7 is for converting an inputted analog image signal into a digital image signal which is delivered to the AE part 1a, the AF part 1b, and an image process portion (image process circuit) 8.

The image process portion 8 carries out well-known processes including a white balance process for correcting a white balance of an image, a synchronization process for dividing an RGB Bayer signal into three frames and a tone correcting process for correcting a tone of an image. The image process portion 8 further carries out data compression of a well-known type such as a JPE type, for compressing processed digital image signals, and stores the compressed image signals into a recording medium such as a memory card 9. Further, an image memory 10 serves as a buffer memory which is used during any of various image processes in the image process portion 8.

Further, a display portion 11 displays thereon an image which has been image-processed in the image process portion 8. It is noted that the display portion 11 displays a focus detection area (AF area) when AF is in operation.

Further, the processed in the image process portion can be transferred to a unit such as a PC external of the digital camera through an interface (I/F) 12.

Further, the CPU 1 is coupled to a key board 13 for manipulating various kinds of operation in the digital camera. When the user manipulates the keyboard 13, a signal depending upon a manipulated condition is input to the CPU 1 which carries out various processes in accordance with a content of the inputted signal.

Further, the CPU 1 is connected to a flash circuit 14. The CPU 1 controls the flash circuit 14 to project fill light to an object if the object is dark upon exposure.

Further, the CPU 1 is connected thereto with a power source circuit 15 which is composed of, for example, an AC/DC converter and the like, and which feeds a power to the circuits shown in FIG. 1 after it convert a power from a battery into d.c. powers to be used in the circuits.

Figure 2:
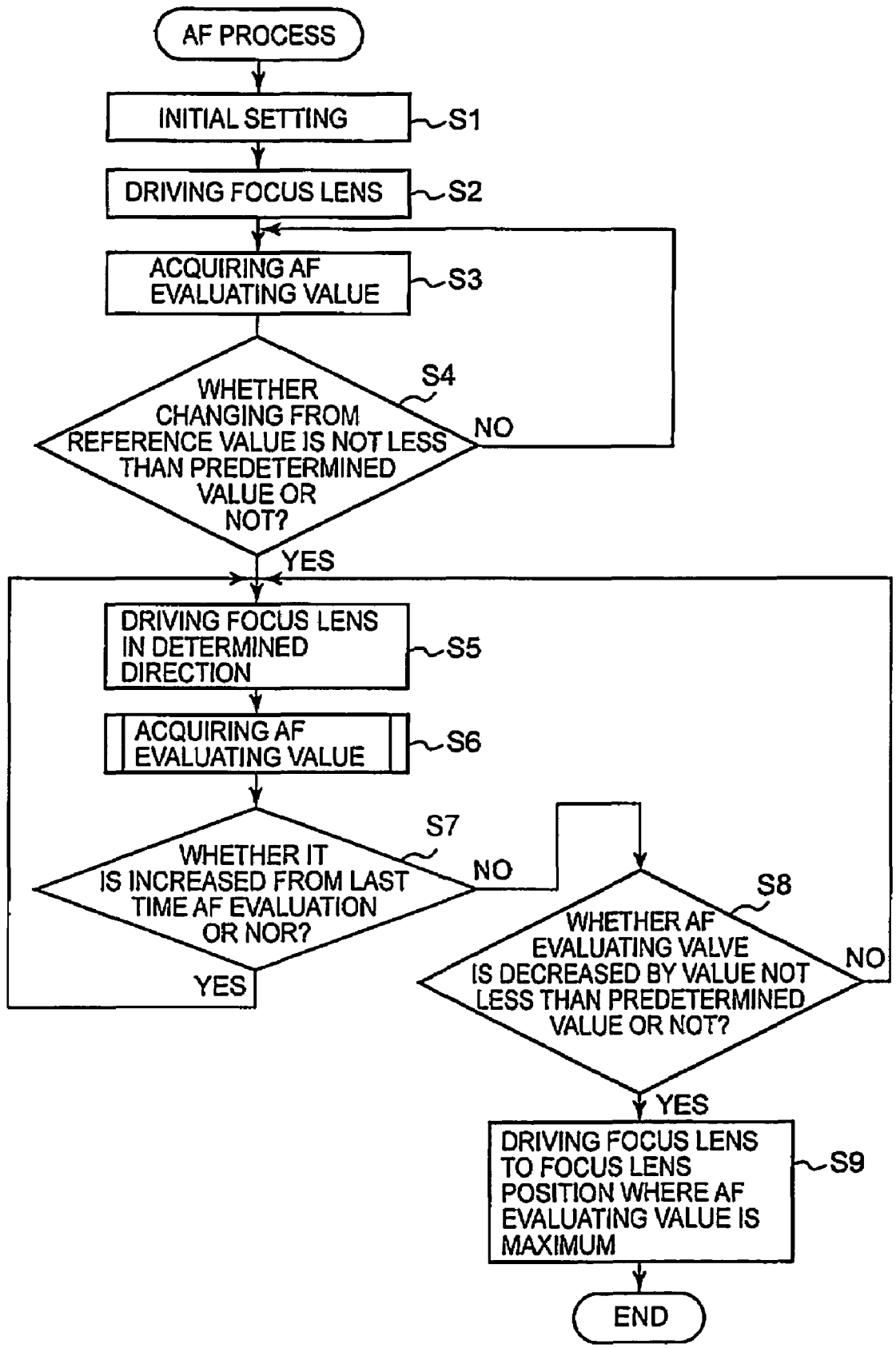
FIG. 2 is a flow chart for explaining an entire process flow of an AF process.

Next, explanation will be made of a focus adjusting process in the first embodiment. FIG. 2 is a flow-chart for explaining an entire work flow of the AF process under the control of the CPU 1. It is assumed that the AF process in FIG. 2 is a hill climbing type.

When the AF process is started, the CPU 1 carries out various settings for the circuits relating to the AF process in the digital camera (step 1). Upon the initial settings, the CPU 1 resets data held in memories including the RAM 1d. Further, it determines an initial moving direction of the focus lens upon starting of the drive thereof, depending upon the present position of the focus lens, a scene or the like. Further, it acquires an AF evaluation value at the present focus lens position. The AF evaluation value thus obtained is used as a reference value for processes carried out thereafter.

Next, the CPU 1 causes the zoom/focus lens drive circuit 5 to drive the focus lens in the lens group 4 by a predetermined distance (step S2). Then, the CPU 1 causes the AF part 1b to compute an AF evaluating value as a contrast evaluating value from an output of the image pick-up element 6 with respect to the focus lens position obtained at step S2 (step S3). The computation of the AF evaluating value will be detailed later.

After the computation of the AF evaluating value at step S3, the CPU 1 determines whether the computed AF evaluating value is increased or decreased by a predetermined amount or more from the reference value obtained at the time of the initial setting at step S1 (step 4). In the determination at step 4, if the AF evaluating value is not changed by a predetermined amount or more, again at step 3, the AF evaluating value is computed by the AF part 1b.

Meanwhile, in the determination as step 4, if the AF evaluating value is changed by the predetermined value or more, branching into step 5 from step 4, the CPU 1 drives the focus lens (step S5). At this, if the AF evaluating value is changed in its increasing direction, the focus lens is driven in the same direction as that at the last time, but if the AF value evaluating value is changed in its decreasing direction, the focus lens is driven in a direction reverse to that of the last time.

After driving the focus lens, the AF evaluating value is again computed by the AF part 1b (step S6). Next, the CPU 1 determines whether the AF evaluating value computed at sep S6 is increased from the AF evaluating value obtained at the last time or not (step S7). In the determination at step S7, if the AF value is increased, again at step S5, the focus lens is driven in the same direction as that of the last time.

Further, in the determination at step S7, if the AF evaluating value is not increased, branching from step 7 into step 8, the CPU 1 determines whether the AF evaluating value is decreased by a predetermined value or more (step S8). In the determination as step S8, if the AF evaluating value is not decreased by a predetermined value or more, again at step S5, the focus lens is driven in the same direction as that at the previous time.

Meanwhile, in the determination at step S8, if the AF evaluating value is decreased by the predetermined value or more, the AF evaluating value obtained at the last time is maximum. In this case, branching from step 8 into step 9, the CPU 1 drives the focus lens up to a focus lens position where the AF evaluating value becomes maximum (step S9), and then ceases the AF process.

Thus, as shown in FIG. 3A, the AF evaluating value is computed one by one while the focus lens position is changed successively. Further, as shown in FIG. 3B, by detecting the focus lens position where the AF evaluating value becomes maximum, the focus lens is driven up to the focus lens position. That is, the contrast of the image becomes highest at the focus lens position where the AF evaluating value becomes maximum, and accordingly, it can be assumed that a position which is computed from a detected AF evaluating value through interpolation is the correct focused focal point.

Next, explanation will be made of computation of the AF evaluating value at steps S3 and S6. Referring to FIG. 4 which is a flow chart for explaining a computation flow for acquiring the AF evaluating value. It is noted that an AE evaluating value upon AE can also be obtained similar to the AF evaluating value. Thus, detailed explanation of the computation of the AE evaluating value will be omitted.

Figure 5A:
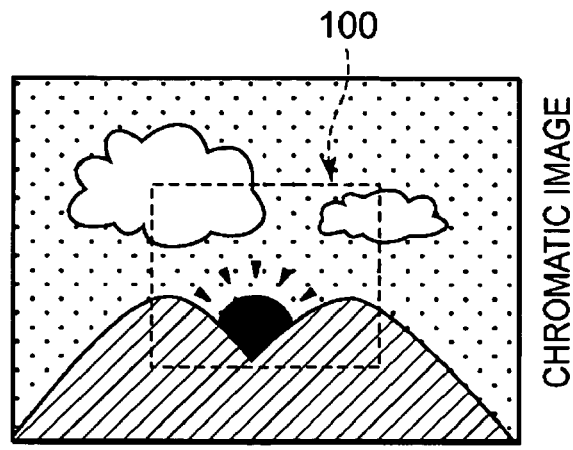
FIGS. 5A to 5C are views for explaining a process flow up to extraction of a contrast value.
Figure 5B:
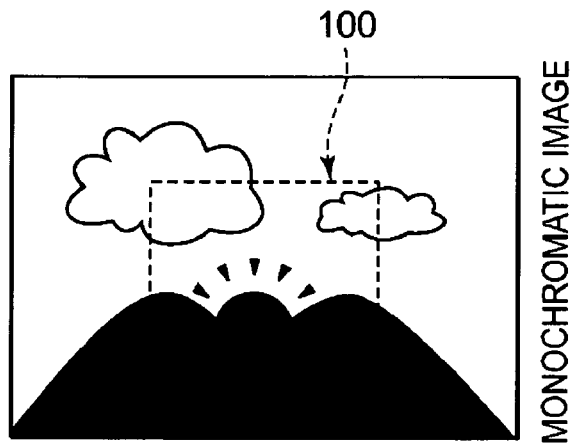

When a digital image signal is input to the AF part 1b, the AF part 1b converts the inputdigital image signal into a luminance signal (step S21). By converting the image signal into the luminance signal, a chromatic image as shown in FIG. 5A is converted into a colorless image (that is, a monochromatic image) only having a tone as shown in FIG. 5B. It is noted that the AF evaluating value is obtained only from an image signal in an AF area 100 shown in FIG. 5A since the time of the computation can be therefore shortened, and since only an AF evaluating value relating to a main object can be obtained therefore by separating the main object and a background object As such, by separating the main object from a background object, the focusing can be made to the main object even in a scene in which a main object and a background object are mingled.

Figure 5C:
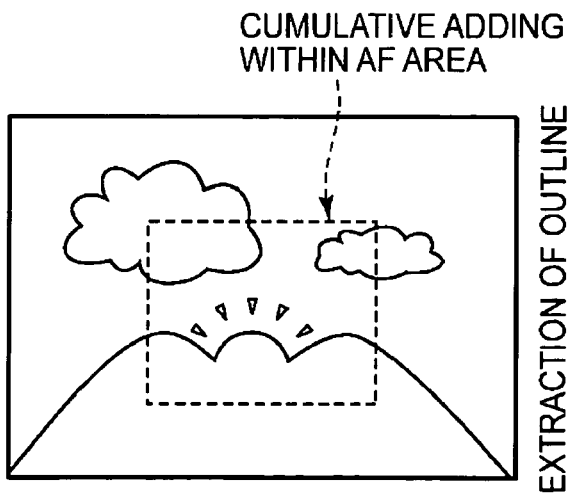

Next, the AF part 1b reorders luminance signals obtained at step S21 in a zigzag-like pattern (step S22). The reordering will be detailed later. Next, the reordered luminance signals are subjected to a low pass filter (LPF) process in order to remove high frequency noise components (step S23). Thereafter, they are subjected to a high pass filter (HPF) process in order to extract high frequency components, that is, contrast values (step S24). At this stage, the HPF process removes luminance signals having frequencies not higher than a predetermined lower cut-off frequency. The extraction of the contrast value as stated above corresponds to the extraction of a feature part (for example, an outline) of the image as shown in FIG. 5C.

After the extraction of the contrast value at step 24, the extracted contrast values are added in accumulation so as to obtain an AF evaluating value (step S25).

Figure 6:
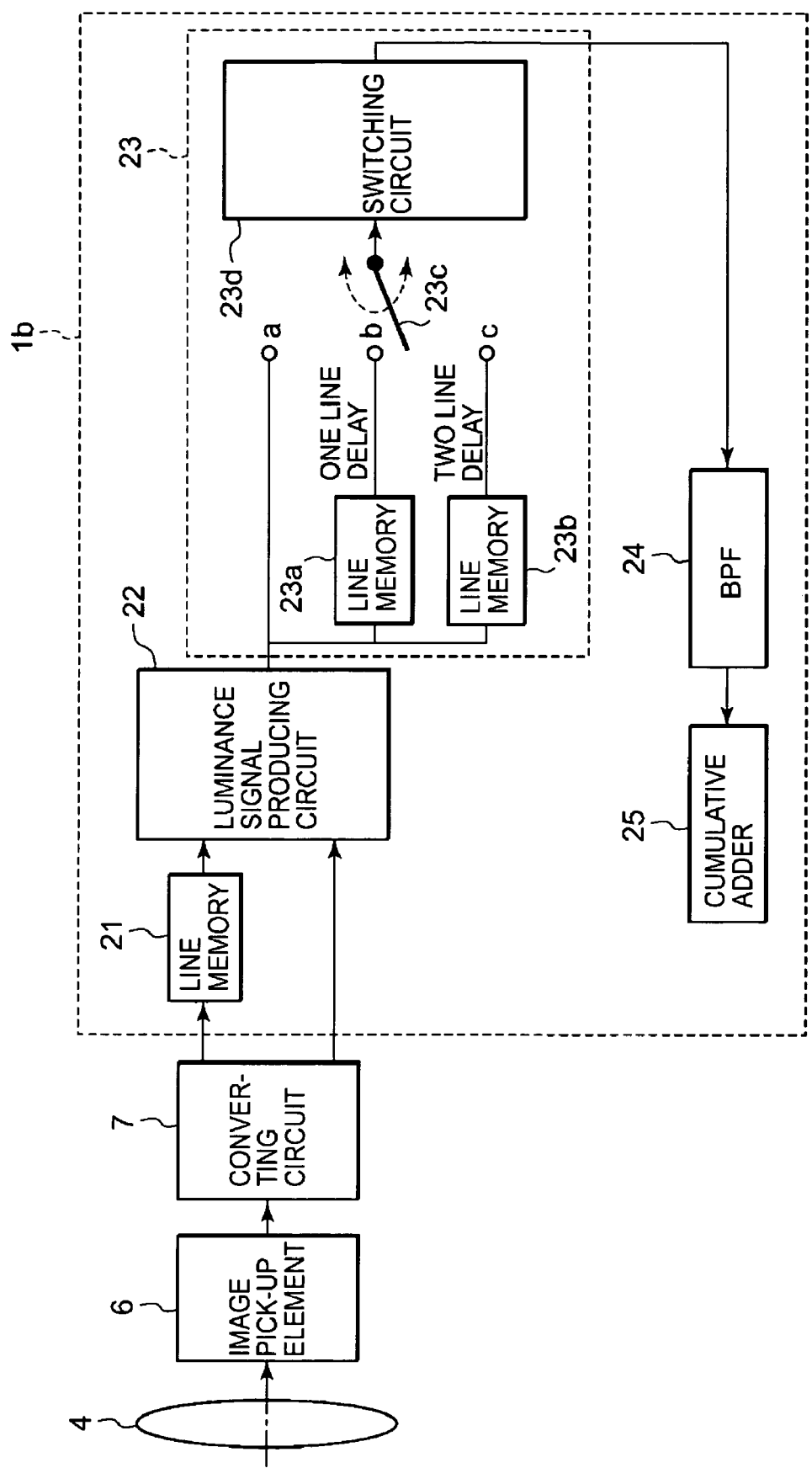
FIG. 6 is a view illustrating an AF part for obtaining an AF evaluating value.

Referring to FIG. 6 which shows the configuration of the AF part 1b for obtaining an AF evaluating value in the first embodiment. As shown in FIG. 6, the AF part 1b comprises a line memory 21, a luminance signal producing circuit (luminance signal producing section) 22, a luminance signal reordering circuit (luminance signal reordering section) 23, a band pass filter (BPF) 24, and a cumulative adder 25. It is noted that a contrast acquiring circuit (contract acquiring section) is composed of the luminance signal producing circuit 22, the luminance signal reordering circuit 23 and a band pass filter 24.

Figure 7:
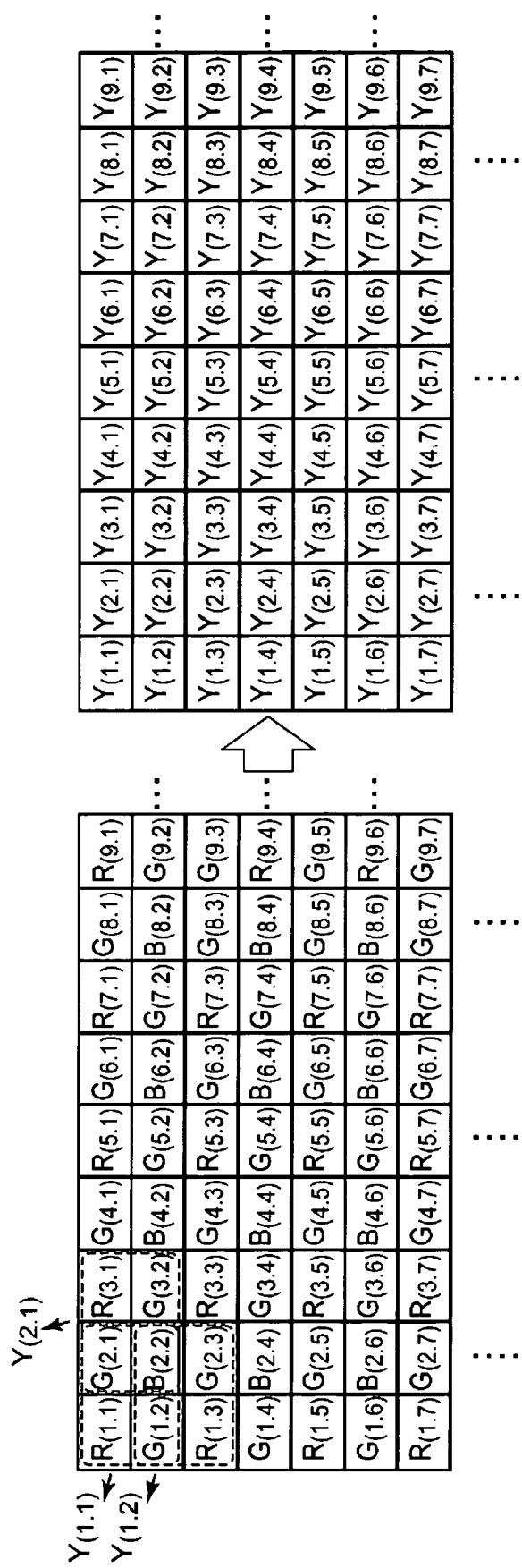
FIG. 7 is a view for explaining conversion from a digital image signal into a luminance signal.
Figure 8:
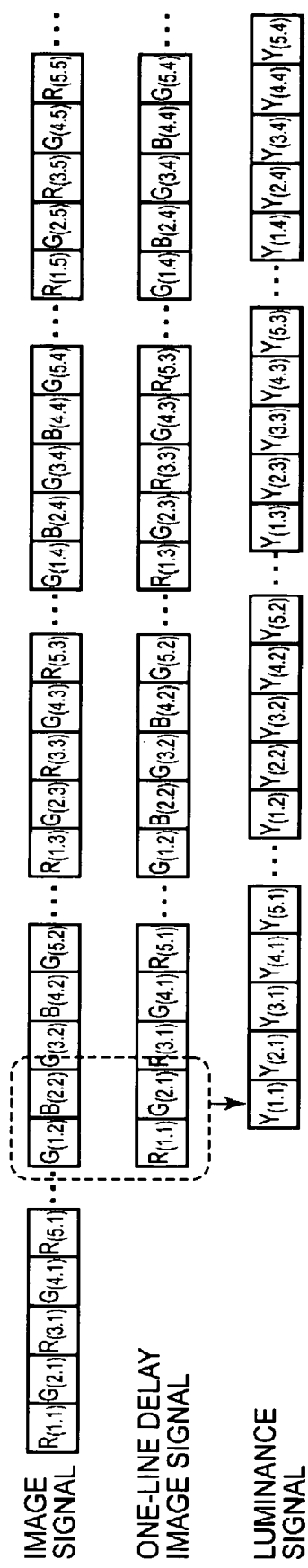
FIG. 8 is a timing chart for explaining a digital image signal into a luminance signal.

A digital image signal in the AF area 100 shown in FIG. 5A is input from the A/D converter 7 into the AF part 1b. The digital image signal input to the AF part 1b is input to the line memory 21 and the luminance signal producing circuit 22. The line memory 21 delays the digital image signal by one line, and then delivers the delayed signal to the luminance signal producing circuit 22. Thus, the digital image signal which has not delayed and the digital image signal which has been delayed by one line are both inputted to the luminance signal producing circuit 22. It is noted here that a luminance signal Y for a pixel is obtained by computing $Y=\alpha R+\beta G+\gamma B$ for every digital image signal for four pixels indicated by a broken line frame shown in FIG. 7, where R denotes a red color component of the image signal, G a green component and B a blue component, and $\alpha$, $\beta$ and $\gamma$ are weighing factors. Referring to FIG. 8 which is a timing chart for explaining the conversion from an image signal into a luminance signal, a luminance signal for one pixel is produced by computing the above-mentioned formula using a digital image signal for two pixels which is input to the luminance signal producing circuit 22 from the A/D converting circuit 7 with no delay and a digital image signal for two pixels which is input into the luminance signal producing circuit 22 being delayed by one line through the line memory 21. It is noted in the above-mentioned formula that the factors for obtaining the luminance signal are such as $\alpha=0.3$, $\beta=0.59$, $\gamma=0.11$ in the case of, for example, NTSC signal. Further, since there are two pixels of G components in four pixels (GRB Bayer array) shown in FIG. 7, an averaged value for two G pixels are used for the G components.

Figure 9:
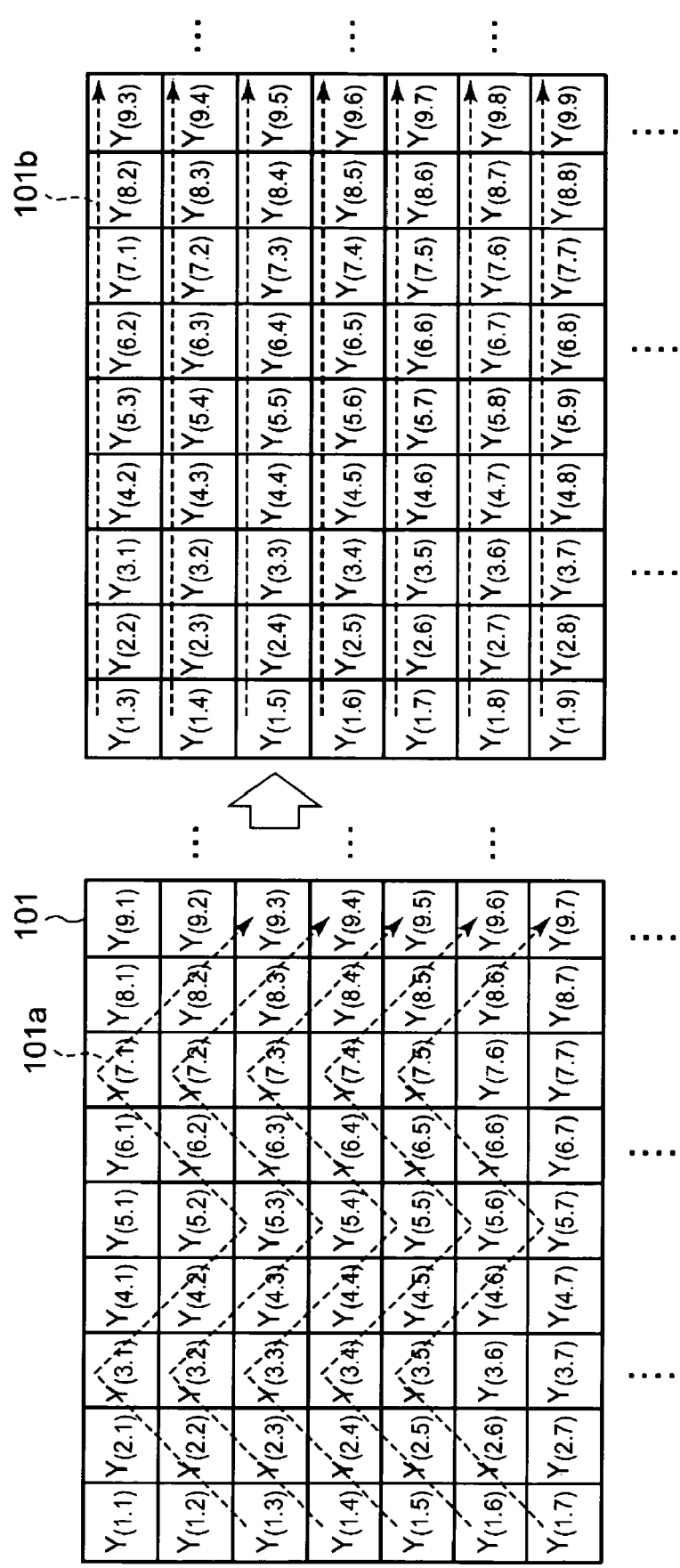
FIG. 9 is a view for explaining a zigzag-like scan for luminance signals.

The luminance signals produced by the luminance signal producing circuit 22 are input into the luminance signal reordering circuit 23 which reorders the luminance signal input from the luminance signal producing circuit 22 so that scanning, that includes at least a part where scan is performed in a zigzag-like manner, can be made. The wording "scanning that includes at least a part where scan is performed in a zigzag-like manner" gives, as shown in FIG. 9, such meaning that the luminance signals in the AF area 101 which have been input from the luminance signal producing circuit 22 are scanned in oblique directions, within a predetermined width (a width of 3 lines in the example shown in FIG. 9) of a vertical direction as indicated by reference numeral 101a. It is preferable to align the upper end and the lower end of the AF area 101 with the positions of apex points of the zigzag line (the upper ends and the lower ends of the zigzag line), respectively. Thus, it is possible to enhance the matching between the display position in the AF area and the detection range of the AF evaluating value.

Next, explanation will be made of the luminance signal reordering circuit 23 for reordering the luminance signals. Referring to FIG. 6, the luminance signal reordering circuit 23 comprises at least one line memory (two line memories 23a, 23b are provided in the example shown in FIG. 6) serving as a delay circuit (delay section), a switch 23c and a switching circuit 23d serving as a luminance signal reordering circuit (luminance signal reordering section). Referring to FIG. 6, the output of the luminance signal producing circuit 22 is connected to a contact a, to a contact b through the line memory 23a, and to a contact c through the line memory 23b. These contacts a to c are connected to the switching circuit 23d through the switch 23c. The output of the switching circuit 23d is connected to a BPF circuit 24.

The line memory 23a delays a luminance signal, input from the luminance signal producing circuit 22, by one line, and then outputs the delayed signal to the contact b. Further, the line memory 23b delays a luminance signal, input from the luminance signal producing circuit 22, by two lines, and then outputs the delayed signal to the contact c.

Figure 10:
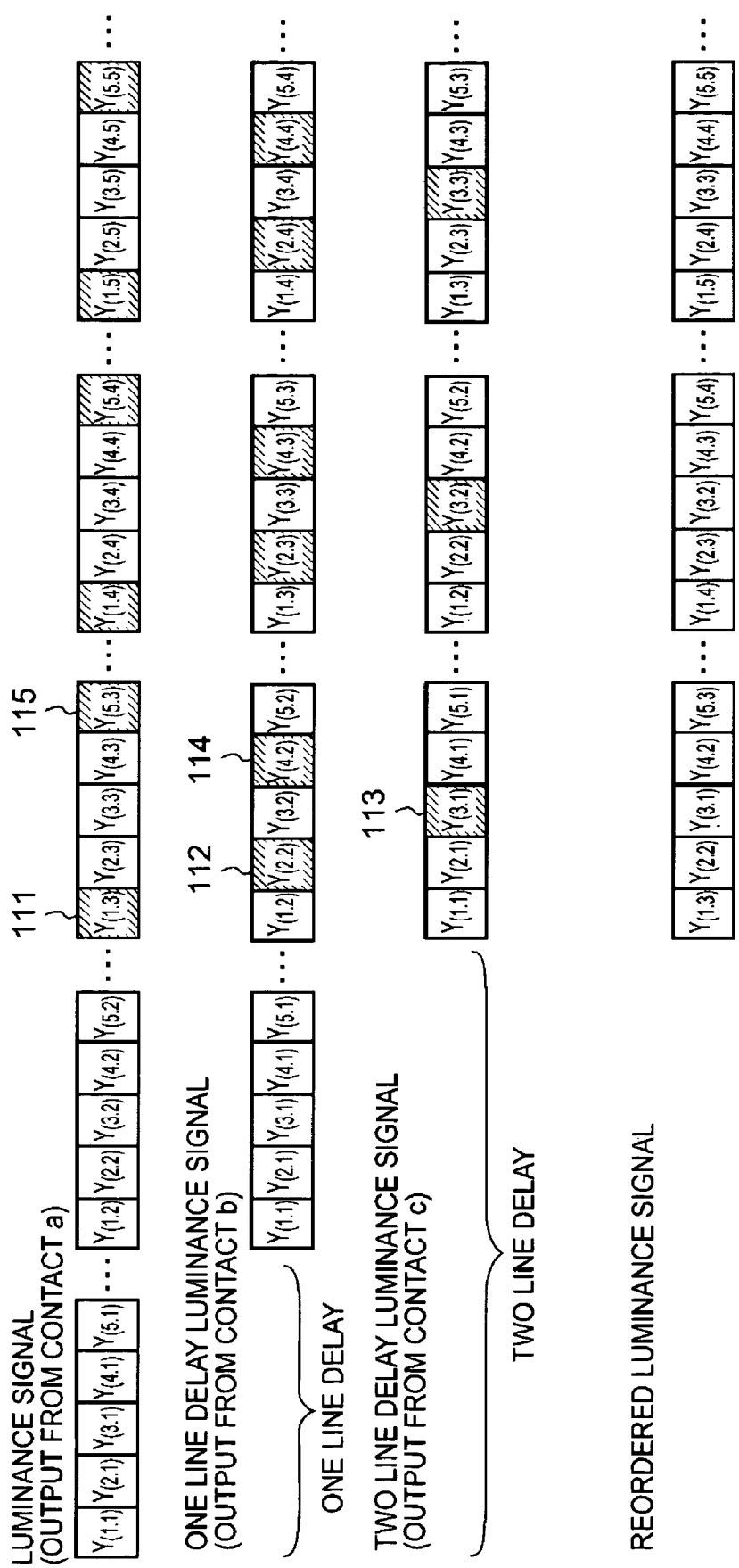
FIG. 10 is a timing chart for explaining operation of a switching circuit in the first embodiment of the present invention.

The switching circuit 23d changes over the switch 23c in order to carry out the reordering as shown in FIG. 9. FIG. 10 shows a timing chart for explaining the change-over of the switching states of the switching circuit 23d.

Referring to FIG. 10, the switching circuit 23d changes over, at first, the switch 23c to the contact a so as to read out a luminance signal Y (1, 3) indicated by reference numeral 111. Next, the switching circuit 23d changes over the switch 23c to the contact b so as to read out a luminance signal Y (2, 2) indicated by reference numeral 112. Next, the switching circuit 23d changes over the switch 23c to the contact c so as to read out a luminance signal Y(3, 1) indicated by reference numeral 113. Then, the switching circuit 23d changes over the switch 23c to the contact b so as to read out a luminance signal Y(4, 2) indicated by reference numeral 114. Next, the switching circuit 23d changes over the switch 23c to the contact a so as to read out a luminance signal Y(5, 3) indicated by reference numeral 115.

Subsequently, as stated above, the switch circuit 23d changes over the switch 23c one by one to the contact a, the contact b, the contact c, the contact b, the contact a . . . in the mentioned order, so that the luminance signals are input to the BPF 24 in the order indicated by reference numeral 101b shown in FIG. 9.

The BPF 24 serving as a contrast extracting section is composed of a low pass filer (LPF) and a high pass filter (HPF), so as to carry out removal of high frequency components and extraction of contrast values from the luminance signals. The contrast values obtained in the BPF 24 are inputted to a cumulative adder 25 which adds in accumulation the contrast values in order to compute the AF evaluating value. The CPU 1 carries out process steps S4, S7 and S8, using the AF evaluating value computed by the cumulative adder 25.

As stated above, in the first embodiment, by reordering the luminance signals so as to scan the luminance signals in a zigzag-like manner, both horizontal components and vertical components of the contract values can be extracted simultaneously. Accordingly, focusing can be made accurately even for an object having no high contrast in a horizontal direction.

Further, the first embodiment can save the capacity of the memory since it is not necessary to read out all pixels in the AF area.

It is noted here that the pixels in the image pick-up element can be arranged in a zigzag-like pattern in order to read out the luminance signal in a zigzag-like manner. However, in this case, some designing restriction may be required for the circuit and the element. On the contrary, since there is no need to change the array of pixels in the image pick-up element, the size of the circuit can be decreased, and further the freedom of design can be prevented from being hindered.

Second Embodiment

Figure 11:
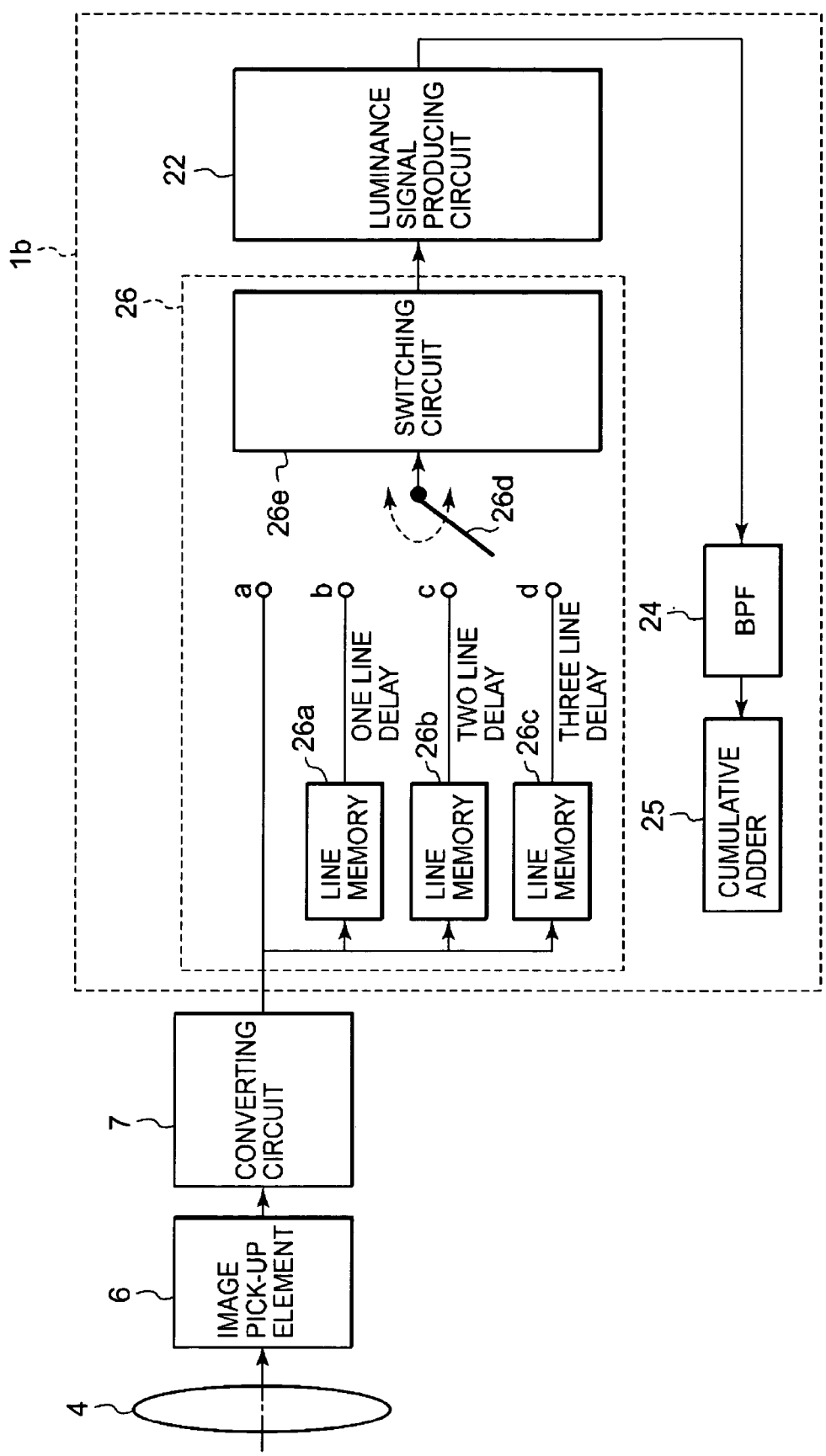
FIG. 11 is a view illustrating a configuration of an AF part for obtaining an AF evaluating value in a second embodiment of the present invention.

Next, explanation will be made of a second embodiment in which not the luminance signal but also digital image signal is scanned in a zigzag-like manner. Referring to FIG. 11 which is a view illustrating a configuration for obtaining the AF evaluating value in the AF part 1b, the AF part 1b comprises a digital image signal reordering circuit 26, a luminance signal producing circuit 22, a band pass filter (BPF) 24 and a cumulative adder 25. It is noted here that the luminance signal producing circuit 22 corresponds to a luminance signal extracting circuit (luminance signal extracting section).

In the second embodiment, an output from the A/D converting circuit 7 is input to the digital image signal reordering circuit 26. The digital image signal reordering circuit 26 is composed of a plurality of line memories 26a, 26b, 26c each serving as a delay circuit (delay section), a switch 26d serving as a digital image signal reordering circuit (digital image signal reordering section) and a switching circuit 26e. Referring to FIG. 11, the output of the A/D converting circuit 7 is connected to a contact a, to a contact b through the line memory 26a, to a contact c through the line memory 26b and to a contact d through the line memory 26c. These contacts a to d are connected to the switching circuit 26e through the switch 26d. The output of the switching circuit 26e is connected to the BPF 24.

Figure 12:
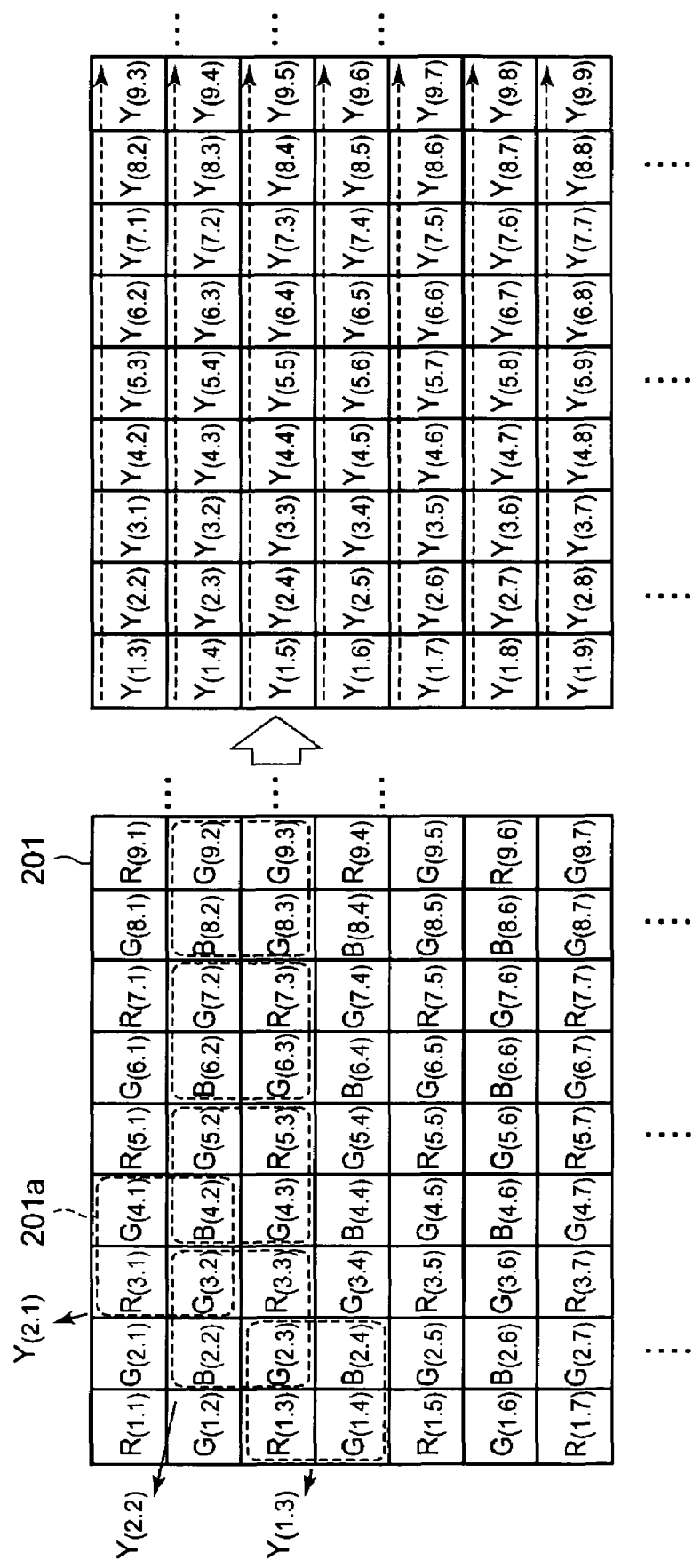
FIG. 12 is a view for explaining a zigzag-like scan of digital image signals.

Such a digital image signal reordering circuit 26 is adapted to scan digital image signals so as to produce a luminance signal through a scanning that at least includes a part where scan in performed in a zigzag-like manner. Specifically, as indicated by reference numeral 201 in FIG. 12, digital image signals input to the luminance signal producing circuit 22 are reordered in such an order that it can be scanned in a zigzag-like manner as indicated by a broken line frame 201a. Accordingly, luminance signals as indicated by reference numeral 201b in FIG. 12 are produced.

Referring to FIG. 11, the line memory 26a delays an inputted digital image signal by one line, and then outputs the delayed signal to the contact b. Further, the line memory 26b delays an inputted digital image signal by 2 lines, and then outputs the delayed signal to the contact c. Further, the line memory 26c delays an inputted digital signal by 3 lines, and then outputs the delayed signal to the contact d. The reason why the number of the line memories is larger than that in the first embodiment is such as to include the line memory (corresponding to the line memory 21 in FIG. 6) for one line delay.

Figure 13:
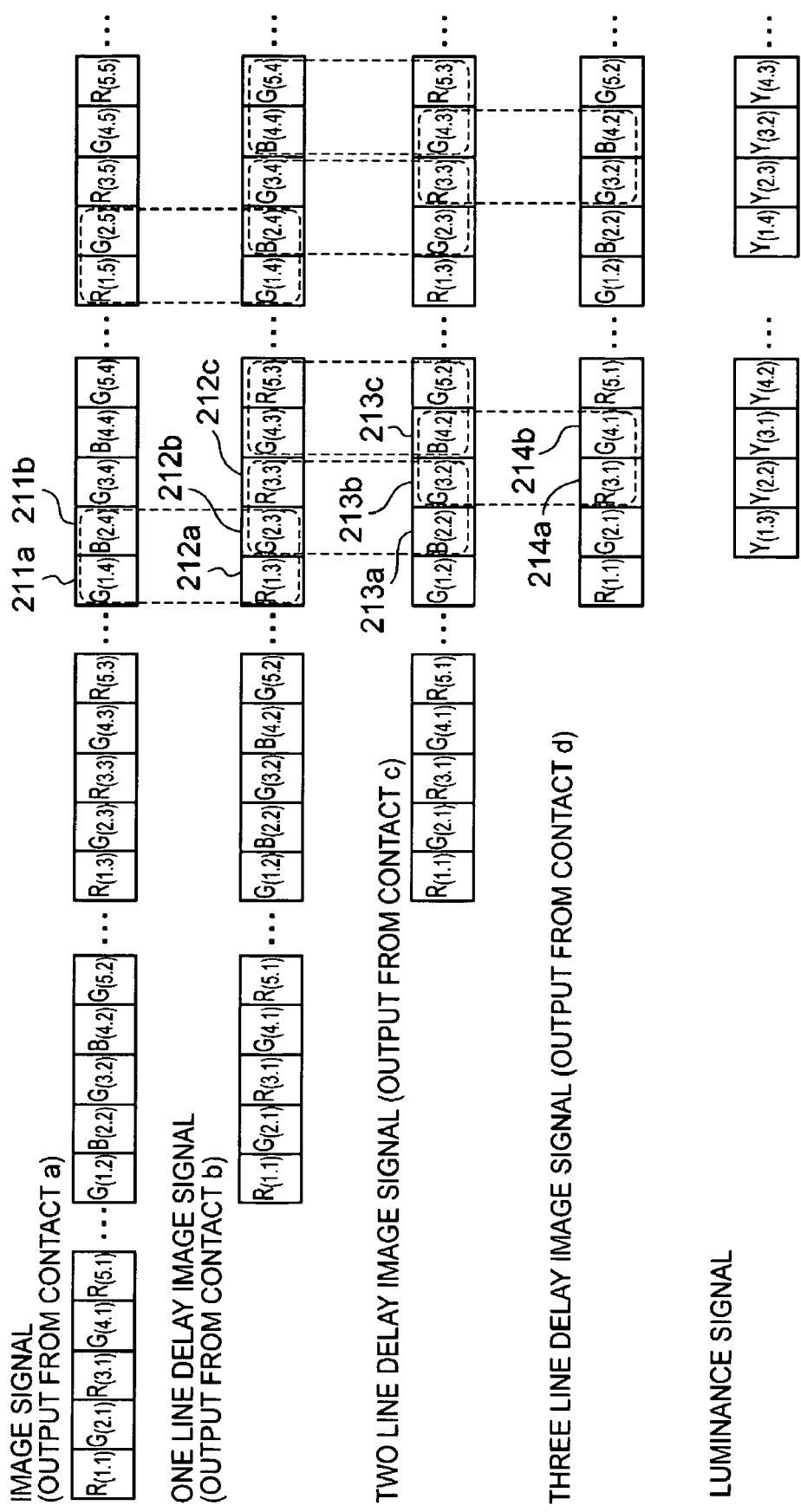
FIG. 13 is a timing chart for explaining operation of a switching circuit in a second embodiment of the present invention.

Referring to FIG. 13 which shows a timing chart for explaining the reordering of digital image signals, different from the first embodiment, in the second embodiment, the switch 26d is changed over for every two pixels.

Referring to FIG. 13, the switching circuit 26e changes over the switch 26d to the contact a so as to read out digital signals for two pixels, that is, a digital signal G(1,4) indicated by reference numeral 211a and a digital image signal B(2,4) indicated by reference numeral 211b. Then, the switching circuit 26e changes over the switch 26d to the contact b so as to read out digital image signals for two pixels, that is, a digital image signal R(1,3) indicated by reference numeral 212a and a digital image signal G(2,3) indicated by reference numeral 212b. Thereafter, the luminance signal producing circuit 22 produces a luminance signal for one pixel from these digital image signals for four pixels.

At the next read-out timing, the switching circuit does not change over the switch 26d, but reads out image signals for two pixels, that is, a digital image signal G(2,3) indicated by reference numeral 212b and a digital image signal R(3,3) indicated by reference numeral 212c. Next, the switching circuit 26e changes over the switch 26d to the contact c so as to read out digital image signals for two pixels, that is, a digital image signal B(2,2) indicated by reference numeral 213a and a digital image signal G(3,2) indicated by reference numeral 213b.

At the next read-out timing, the switching circuit 26e does not change over the switch 26d, but reads out two digital image signals for two pixels, that is, a digital image signal G(3,2) indicated by reference numeral 213b and a digital image signal B(4,2) indicated by the reference numeral 213c. Next, the switching circuit 26e changes over the switch 26d to the contact d so as to read digital image signals for two pixels, that is, a digital image signal R(3,1) indicated by reference numeral 214a and a digital image signal G(4,1) indicated by reference numeral 214b.

Thereafter, the switching circuit 26e changes over the switch 23c so as to scan digital image signals in a zigzag-like manner, and accordingly, the digital image signals are read out in the order shown in FIG. 12 and are then converted one by one into luminance signals. It is noted that, subsequent to the luminance signal producing circuit, the operations of the BPF 24 and the cumulative adder 25 are similar to those explained in the first embodiment.

As stated above, in the second embodiment, digital image signals are reordered so as to produce luminance signals which have been scanned so as to include at least a part scanned in a zigzag-like manner, thereby it is possible to achieve technical effects and advantages similar to those obtained in the first embodiment.

Third Embodiment

Next, explanation will be made of a third embodiment of the present invention. The third embodiment is arranged to change the zigzag-like pattern during zigzag-like scanning. It is noted that the example explained hereinbelow is based upon the first embodiment, but the techniques explained in the third embodiment may also applied to the second embodiment.

Figure 14A:
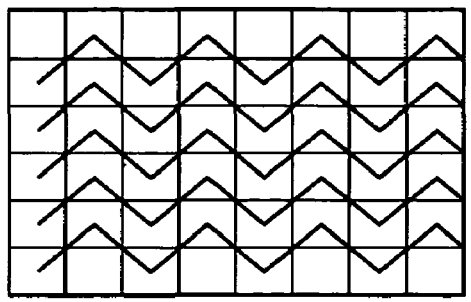
FIGS. 14A to 14C are views illustrating V-widths in a third embodiment of the present invention.
Figure 14B:
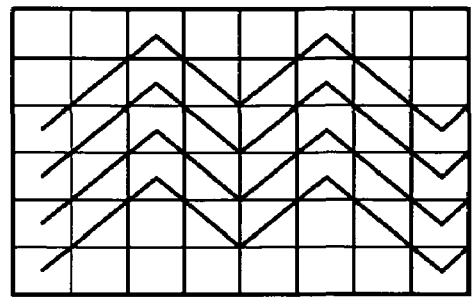
Figure 14C:
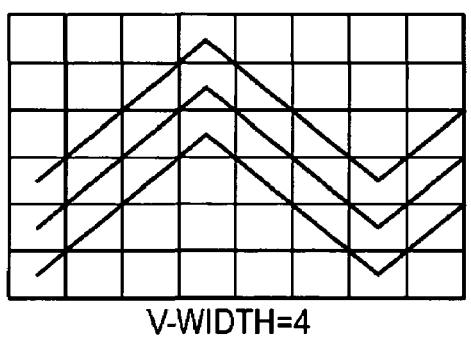

At first, in the third embodiment, the width (which will be referred to as "V-width") of a luminance signal in a vertical direction can be changed. If the V-width is set to, for example, 2, the zigzag-like pattern can be set to be that shown in FIG. 14A. Further, it the V-width is set to 3, the zigzag-like pattern can be set to be that shown in FIG. 14B. Moreover, if the V-width is set to 4, the zigzag pattern is set to be that shown in FIG. 14C.

Figure 15A:
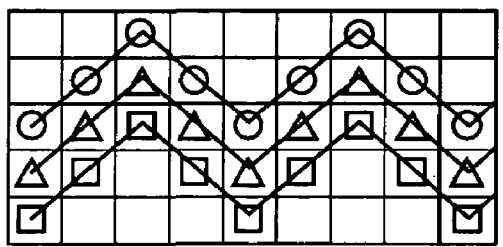
FIGS. 15A to 15C are views illustrating change of gradients in the third embodiment of the present invention.

Further, in the third embodiment, the gradient of a zigzag-line, that is, a ratio (V/H) between a read-out width (which will be hereinbelow referred to as "H-width) in a horizontal direction and a read-out width (V-width) in a vertical direction, can be changed. If the ratio V/H is set to, for example, 1, a zigzag-like pattern shown in FIG. 15A can be obtained. Further, if the ratio V/H is set to 3/4, a zigzag-like pattern shown in FIG. 15B can be obtained. Further, it the ratio V/H is set to 4/3, a zigzag-like pattern shown in FIG. 15C can be obtained.

Figure 15B:
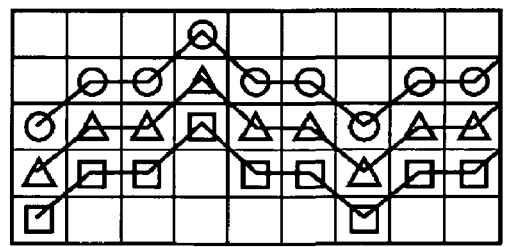
Figure 15C:
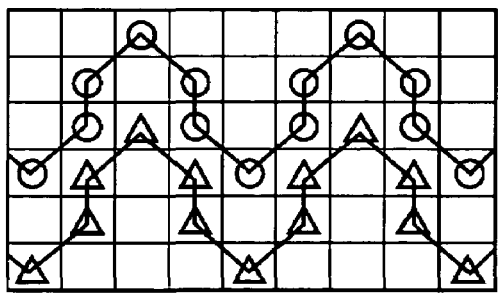
Figure 16:
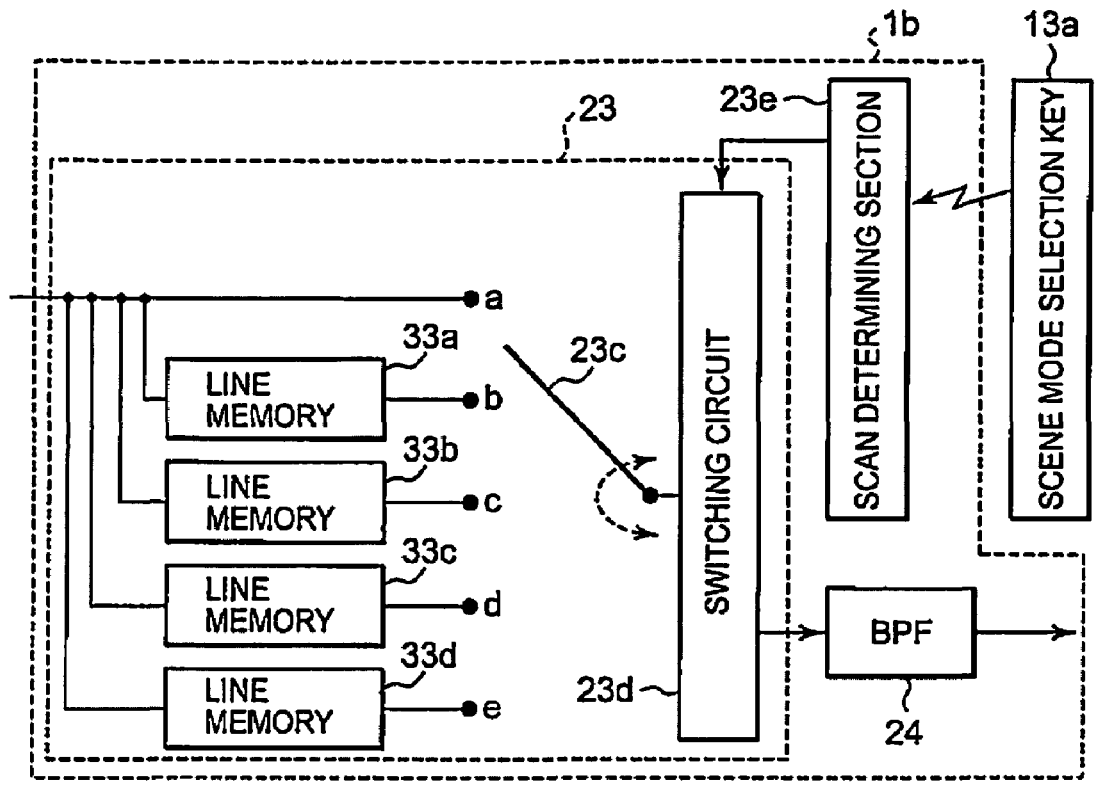
FIG. 16 is a view illustrating a configuration of an AF part in the third embodiment of the present invention.

Referring to FIG. 16 shows a configuration, as an example, of the AF part 1b for changing the zigzag-like pattern, as shown in FIG. 14 and FIG. 15. It is noted that illustrations of the line memory 21, the luminance signal producing circuit 22 and the cumulative adder 25 are omitted.

The configuration shown in FIG. 16 is the same as that shown in FIG. 6, except that the number of line memories in the luminance signal reordering circuit 23 is different from that shown in FIG. 6, and a scan determining section 23e is provided.

In the line memories shown in FIG. 16, a line memory 33a is for one line delay, a line memory 33b is for two line delay, and a line memory 33c is for three line delay while a line memory 33d is for four line delay. With the use of these four line memories, the V-width can be changed from 2 to 5. For example, when the V-width is set to 2, only the line memory 33a is used, while when the V-width is set to 4, three line memories, that is, the line memory 33a, the line memory 33b and the line memory 33c are used. Further, the H-width may be changed by changing the read-out position of a luminance signal in a line memory.

Further, the scan determining portion 23e serving as a vertical width changing section and a gradient changing section controls the switching circuit 23d in accordance with a scene mode upon image pick-up. That is, the scan determining section 23e which has been previously stored therein with zigzag patterns as shown in FIGS. 14 and 15, controls the change-over of the switch 23c by the switching circuit 23d in accordance with a scene mode upon image pick-up.

It is noted that the scene mode upon image pick-up is set by manipulating a scene mode selection key 13a which is included in the keyboard 13 shown in FIG. 1.

For example, a view of a mountain or a sea tends to contain less horizontal contrast components. Accordingly, in a mode for picking up a landscape, the V-width and the gradient are increased so as to obtain large numbers of vertical contrast components. On the contrary, a view of a building or the like tends to contain a larger number of horizontal contrasts than that of vertical components. Thus, in a mode for picking up a building or the like, the V-width and the gradient of a zigzag line are decreased to obtain a larger number of horizontal components.

Explanation will be hereinbelow made of specific operation as to FIG. 16. For example, in the case of the read-out shown in, for example, FIG. 15B, at first, the scan determining section 23e delivers an instruction to the switching circuit 23d in order to change over the switch 23c to the contact a. Thus, a luminance signal Y (1, 3) is read out. Next, the scan determining section 23e delivers an instruction to the switching circuit 23d in order to change over the switch 23c to the contact b. Thus, a luminance signals Y(2,2) and a luminance signal Y(3,2) are read out. Then, the scan determining section 23d delivers an instruction to the switching circuit 23d in order to change over the switch 23c to the contact c, and accordingly, a luminance signal Y(4,1) is read out. Next, the scan determining section 23e delivers an instruction to the switching circuit 23d in order to change over the switch 23c to the contact b, and accordingly, a luminance signal Y(5,2) and a luminance signal Y(6,2) are read out. Then, the scan determining section 23e delivers an instruction to the switching circuit 23d in order to change over the switch 23c to the contact a, and accordingly, a luminance signal Y(7,3) is read out. Next, the scan determining section 23e delivers an instruction to the switching circuit 23d in order to change over the switch 23c to the contact b, and accordingly, a luminance signal (8,2) and a luminance signal (9,2) are read out. Thus, the switch is similarly changed over one by one so as to carry out the read-out as shown in FIG. 15B.

Figure 17:
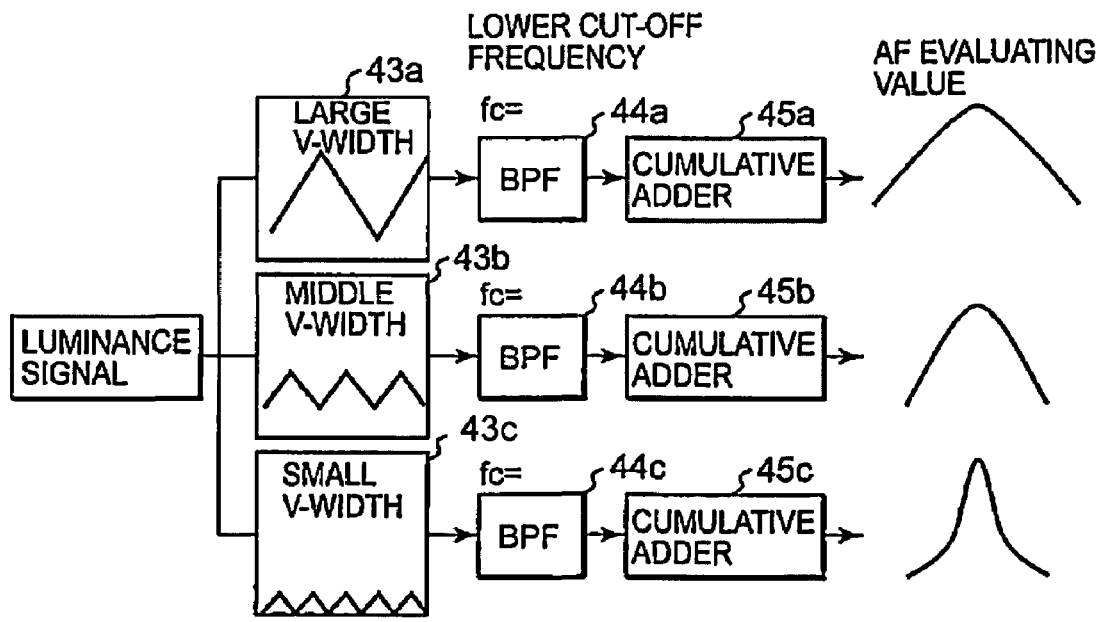
FIG. 17 is a view illustrating a variant form of the configuration of the AF part in the third embodiment of the present invention.

It is noted here that a single luminance signal reordering circuit is provided therein with a plurality of line memories and certain number, depending on a V-width, of the line memories are used in the configuration shown in FIG. 16. However, as shown in FIG. 17, a plurality of luminance signal reordering circuits 43a to 43c can be provided in order to scan luminance signals with a plurality of V-widths depending upon a scene mode. In this case, BPFs may be provided in accordance with a V-width in the luminance signal reordering circuit. In the example as shown in FIG. 17, the luminance signal reordering circuit 43a having a large V-width is connected thereto with a BPF 44a having a low lower cut-off frequency range, the luminance signal reordering circuit 43b having a middle V-width thereto with a BPF 44b having a middle lower cut-off frequency range, and the luminance signal reordering circuit 43c having a small V-width thereto with a BPF 44c having a low lower cut-off frequency range. Further, these BPFs 44a to 44d are connected thereto with cumulative adders 45a to 45c, respectively.

In the configuration shown in FIG. 17, digital signals outputted from the A/D converting circuit 7 are inputted to the luminance signal reordering circuits 43a to 43c, respectively. The respective luminance signal reordering circuits 43a to 43c scan luminance signals with respective different V-widths, and outputs the results of the scan to a downstream stage BPF. The BPFs 44a to 44c remove luminance signals having components with frequencies not higher than low cut-off frequency ranges which are respectively set therein in order to obtain contrast values.

It is noted here that in the case of a large V-width, luminance signals in a wider range from a low frequency component to a high frequency component may be outputted to the BPFs, and accordingly, the lower cut-off frequency range of the BPF 44a is set to be low in order to obtain a width contract value. Meanwhile, in the case of a small V-width, high frequency components may be extracted, easier than in the case of a large V-width, and accordingly, the lower cut-off frequency range of the BPF 44c is set to be high. With this configuration, it is possible to extract a contrast value appropriate for a scene mode upon image pick-up.

The contrast values having obtained in the respective BPFs, are inputted to the cumulative adders 45a to 45c which add the contrast values in accumulation in order to compute an AF evaluating value. Outputs from the cumulative adders 45a to 45c are selectively outputted to the CPU1 in accordance with a scene mode.

As stated above, according to a third embodiment, the zigzag pattern may be changed in accordance with a scene mode upon image pick-up, and accordingly, the AF may be made appropriately for a property of an object to be picked up upon image pick-up.

It is noted that the V-width and the zigzag patter should not be limited those shown in FIGS. 14 and 15. For example, the number of line memory may be increased in order to increase the V-width.

While there has been shown and described what are considered to be preferred embodiments of the invention, it will, of course, be understood that various modifications and changes in form or detail could readily be made without departing from the sprit of the invention. It is therefore intended that the invention should not be limited to the exact forms described and illustrated, but constructed to cover all modifications that may fall within the scope of the appended claims.

What is claimed is:

1. An automatic focusing device comprising:
   an image pick-up element for picking up an image of an object, and obtaining an image signal;
   an A/D converting circuit for converting the image signal obtained by the image pick-up element into a digital image signal;
   a contrast acquiring portion for producing a luminance signal through a scanning which contains at least a part where the scanning is performed in a zigzag manner, from the digital image signals obtained by the A/D converting circuit, and for acquiring a contrast value from the produced luminance signal,
   a cumulative adding portion for adding the contrast value obtained by the contrast acquiring section in accumulation to compute a contrast evaluating value; and
   a focus lens drive portion for driving a focus lens to a position where the contrast evaluating value computed by the cumulative adding portion becomes maximum,
   wherein the contrast acquiring portion includes:
   a luminance signal producing section for producing a luminance signal from the digital image signal obtained by the A/D converting circuit;
   at least one delay section for delaying the luminance signal produced by the luminance signal producing section;
   a luminance signal reordering section for reordering a luminance signal delayed by the delay section and a luminance signal produced in the luminance signal producing section so that a reordered luminance signal contains at least a part where the scanning is performed in a zigzag manner; and
   a contrast extracting section for scanning the luminance signal reordered in the luminance signal reordering portion so that the reordered luminance signal contains at least a part where the scanning is performed in a zigzag manner to extract a contrast value.

2. An automatic focusing device according to claim 1, wherein the luminance signal reordering section includes a switching section for selectively outputting a luminance signal delayed by the delay section and a luminance signal produced in the luminance signal producing section, to the contrast extracting section.

3. An automatic focusing device according to claim 1, wherein the scanning including at least a part where the scanning is performed in a zigzag manner, is to scan the luminance signal or the digital image signal in an oblique direction within a predetermined width of the vertical direction, and
   the automatic focusing device further comprises a vertical width changing portion for changing the predetermined width of the vertical direction.

4. An automatic focusing device according to claim 1, wherein the scanning including at least a part where the scanning is performed in a zigzag manner, is to scan the luminance signal or the digital image signals in an oblique direction within a predetermined width of the vertical direction, and
   the automatic focusing device further comprises a gradient changing portion for changing a gradient of the zigzag scanning.

5. An automatic focusing device according to claim 1, further comprising a display portion for displaying a detection zone for detecting the contrast evaluating value,
   wherein turning points of the zigzag scan, that is at least contained in the scanning, correspond with pixels located on the upper or lower end the detection zone.

6. An automatic focusing device according to claim 3, wherein the width of the vertical direction is changed in accordance with a scene mode chosen upon image pick-up.

7. An automatic focusing device according to claim 3, wherein the contrast acquiring section includes therein a high pass filter having a lower cut-off frequency which is changed in accordance with the width of the vertical direction.

8. An automatic focusing device according to claim 4, wherein the gradient is changed in accordance with a scene mode chosen upon image pick-up.

9. An automatic focusing device according to claim 4, wherein the contrast acquiring section includes therein a high pass filter having a lower cut-off frequency which is changed in accordance with the gradient.

10. An automatic focusing device comprising:
    an image pick-up element for picking up an image of an object, and obtaining an image signal;
    an A/D converting circuit for converting the image signal obtained by the image pick-up element into a digital image signal;
    a contrast acquiring portion for producing a luminance signal through a scanning which contains at least a part where the scanning is performed in a zigzag manner, from the digital image signals obtained by the A/D converting circuit, and for acquiring a contrast value from the produced luminance signal;
    a cumulative adding portion for adding the contrast value obtained by the contrast acquiring section in accumulation to compute a contrast evaluating value; and a focus lens drive portion for driving a focus lens to a position where the contrast evaluating value computed by the cumulative adding portion becomes maximum,
wherein the contrast acquiring portion includes:
at least two delay sections for delaying a digital image signal obtained in the A/D converting;
a digital image signal reordering section for reordering at least two digital image signals delayed in the delay sections and the digital image signal obtained in the A/D converting circuit so that a luminance signal, scanned so as to at least contain a part where the scanning is performed in a zigzag manner, can be obtained; and
a luminance signal extracting section for scanning the digital image signal reordered in the digital image signal reordering section so as to extract the luminance signal at least containing a part where the scanning is performed in a zigzag manner.

11. An automatic focusing device according to claim 10, wherein the digital image signal reordering section includes a switching portion for selectively outputting a digital image signal delayed in the delay part and a digital signal obtained in the A/D converting circuit to the luminance signal extracting section.

12. An automatic focusing device according to claim 10, wherein the scanning including at least a part where the scanning is performed in a zigzag manner, is to scan the luminance signal or the digital image signal in an oblique direction within a predetermined width of the vertical direction, and
the automatic focusing device further comprises a vertical width changing portion for changing the predetermined width of the vertical direction.

13. An automatic focusing device according to claim 10, wherein the scanning including at least a part where the scanning is performed in a zigzag manner, is to scan the luminance signal or the digital image signal in an oblique direction within a predetermined width of the vertical direction, and
the automatic focusing device further comprises a gradient changing portion for changing a gradient of a scanning.

14. An automatic focusing device according to claim 12, wherein the width of the vertical direction is changed in accordance with a scene mode chosen upon image pick-up.

15. An automatic focusing device according to claim 12, wherein the contrast acquiring section includes therein a high pass filter having a lower cut-off frequency which is changed in accordance with the width of the vertical direction.

16. An automatic focusing device according to claim 13, wherein the gradient is changed in accordance with a scene mode chosen upon image pick-up.

17. An automatic focusing device according to claim 13, wherein the contrast acquiring section includes therein a high pass filter having a lower cut-off frequency which is changed in accordance with the gradient.

18. A focusing method comprising:
obtaining an image signal by picking up an image of an object;
converting the obtained image signal into a digital image signal;
producing a luminance signal from the digital image signal;
delaying the luminance signal by at least one delay section for delaying the luminance signals;
reordering the luminance signal and the delayed luminance signal so that a reordered luminance signal contains at least a part where the scanning is performed in a zigzag manner;
obtaining a contrast value through scanning the luminance reordered signal so that the reordered luminance signal contains at least a part where the scanning is performed in a zigzag manner;
adding in accumulation the contrast value to compute a contrast evaluating value; and
driving a focus lens to a position where the computed contrast evaluating value is maximum.

19. A focusing method according to claim 18, wherein the delay section includes a line memory which delays the luminance signal by one line.

* * * * *